Sept. 19, 1961 H. S. KNOWLES 3,001,129

ELECTRONIC OSCILLATOR METERING DEVICE

Filed Nov. 21, 1957

INVENTOR.
H. S. KNOWLES

BY [signature]
[signature]

ATTYS.

3,001,129

ELECTRONIC OSCILLATOR METERING DEVICE

Hugh S. Knowles, Glen Ellyn, Ill., assignor, by mesne assignments, to the United States of America as represented by the Secretary of the Navy Filed Nov. 21, 1957, Ser. No. 698,013
10 Claims. (Cl. 324—34)

This invention relates to electronic oscillators and more particularly to an electronic oscillator in which the oscillations are interrupted selectively in accordance with the magnetic state of a core which is common to two oscillator coils as the magnetism of the core is moved periodically into the region of magnetic saturation by magnetized portions of a cable moving into closely spaced adjacency with respect thereto.

It has been the usual practice heretofore to control the frequency of oscillation of an oscillator by a variable inductance so arranged as to modulate the frequency of oscillation, to change the oscillator frequency by a variable inductance without amplitude modulation, and to obtain amplitude modulation without variable inductance. Such oscillators employ complicated circuit arrangements, a plurality of electron devices and are not, therefore, well suited for counting purposes such, for example, as the metering of a length of mooring cable for a mine to which magnetic markings have been applied at predetermined intervals throughout the length of the cable.

In accordance with the present invention this result is achieved by arranging the plate and grid coils of the oscillator in mutual inductive coupling preferably in substantial alignment and separated in such manner that the coils are inductively coupled. The coupling between the coils is increased by a thin strip of magnetic material arranged within the two coils thereby providing a magnetic core which greatly increases coupling or mutual inductance of the coils. This core material is preferably composed of grain oriented high nickel iron of the character exhibiting a sharp saturation knee in its B-H magnetization curve and initially biased to a point below the knee of the curve whereby the core is saturated periodically by the magnetic markings of the moving cable to block the oscillations of the oscillator intermittently as will more clearly appear as the description proceeds.

One of the objects of this invention is to provide a new and improved oscillator in which the oscillating state thereby is controlled by the magnetic condition of the core material interconnecting the plate and grid coils in response to an external magnetic field selectively applied thereto.

Another object is the provision of new and improved means comprising prebiased core material for modifying the self and mutual inductances of the plate and grid coils of an oscillator as the core material is saturated magnetically at intervals.

Another object is the employment of the magnetic characteristic of a grain oriented high nickel iron core to interrupt the oscillation of an electronic oscillator as the magnetism of the core material is changed from a prebiased condition just below the knee of the magnetization curve to the region of saturation by a moving strip of material having magnetic markings thereon as the material moves past the core.

Still another object is the provision of a new and improved oscillator device in which the oscillating state thereof is controlled by the strength of an external magnetic field applied thereto.

A further object is the provision of new and improved oscillator means for sensing a length of mooring cable having magnetic markings or a signature alternating in direction arranged therealong as the cable is withdrawn by a positively buoyant mine from a mine anchor.

A still further object is to provide an electronic oscillator in which oscillations are controlled by the magnetic state of a strip of magnetic material included in the means for coupling the input and output circuits thereof.

Other objects and many of the attendant advantages of this invention will be readily appreciated as the same becomes better understood by reference to the following detailed description when considered in connection with the accompanying drawings wherein.

Figure 1:
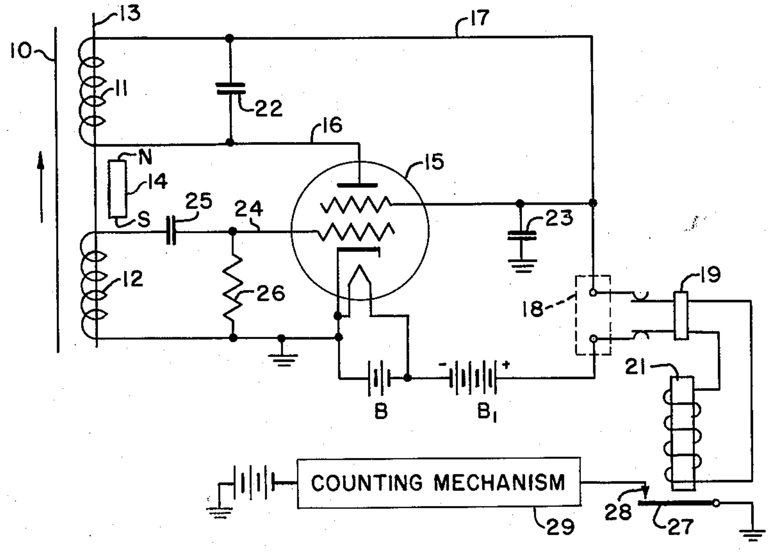
FIG. 1 is a view on which is shown in diagrammatic form an electronic oscillator metering device in accordance with a preferred embodiment of the invention and a length of mooring cable having magnetic markings for controlling the operation thereof.

Referring now to FIG. 1 for a more complete understanding of the invention there is shown thereon in diagrammatic form a metering device for sensing magnetic markings of alternate polarity placed at regular intervals along the cable 10. For the purpose of description let it be assumed that the cable 10 is adapted to be payed out from a cable dispenser within a mine anchor by a positively bouyant mine to which one end of the cable is attached as the mine rises within the water. The cable is disposed within the anchor in such manner that a short length thereof is arranged in closely spaced adjacency to a plate coil 11 and a grid coil 12 of the oscillator, both of these coils preferably being in substantial axial alignment as shown and separated one from the other by a small distance such, for example, as one half inch. The magnetic markings on cable 10 are alternately opposite in character and are applied at convenient intervals, such, for example, as one foot therealong, the overall axial length of the coils 11 and 12 being a small fractional portion of the distance between a pair of consecutive magnetic markings.

Within the coils 11 and 12 is arranged a single magnetic core 13 composed of a strip of magnetic material preferably having a grain oriented high nickel iron content and processed in such manner as to exhibit a sharp saturation knee in its B—H curve. A material which has been found particularly suitable for this purpose is the material described and claimed in Patent 2,569,468 to E. A. Gaugler for "Method of Producing Grain Oriented Ferro-Magnetic Alloys" issued October 2, 1951 which material is currently identified by the name "Alfenol" or "Deltamax," as the case may be, although, if desired, other magnetic material may be employed. The core 13 is arranged generally parallel to the length of cable 10 as shown on FIG. 1 and prebiased by a permanent magnet 14 to a value of magnetism just below the knee of the hysteresis loop characteristic of this material. It will be understood that the knee referred to herein is that portion of the magnetization curve whch occurs just before the material is magnetically saturated by an external magnetizing force applied thereto. A core comprising a strip of "Deltamax," .125" wide and .002" thick, folded along a medial line throughout the length thereof has been found satisfactory for magnetization into the saturation zone thereof by the m.m.f. of the magnetized cable markings as the markings are moved into proximate relation to the core.

The oscillator preferably comprises an electronic tube 15 of conventional design having the plate thereof connected by way of conductor 16 to one end of plate coil 11 from whence the circuit is continued by way of conductor 17, jack 18, plug 19 and winding of relay 21 to the positive terminal of battery B1. A condenser 22 is connected in parallel with coil 11. The screen grid of tube 15 is connected to conductor 17 and to one terminal of condenser 23, the other terminal of condenser 23 being grounded. The control grid of tube 15 is connected by conductor 24, condenser 25, to one terminal of grid coil 12 from whence the circuit is continued to ground. A resistance element 26 is connected in parallel with coil 12 between conductor 24 and ground. The cathode circuit is conventional and therefore will not be further described. The foregoing structure defines an oscillator having input and output circuits as will be clearly apparent to one skilled in the art.

Relay 21 is included in the plate circuit of the tube and is provided with an armature 27 adapted to engage contact 28 as the relay operates, and thus apply a pulse to the counting mechanism 29 each time the relay operates. The counting mechanism may be of any type suitable for the purpose, such, for example, the counting mechanism disclosed in application Serial No. 285,039 of Leon J. Lofthus for "Magnetic Cable Measuring Device," filed April 29, 1952 on which is shown means for arresting further movement of the cable from the mine anchor by swaging the cable thereto when a predetermined number of pulses have been counted.

The magnet 14 is constructed and arranged to bias the core 13 such that the flux density thereof initially is just below the saturation value. With the core in this magnetic state, the device is in stable operation. When the flux density of the core is raised by an additional external m.m.f. applied thereto sufficiently to cause the core to become saturated, the oscillations stop by reason of the change in the inductance of the coils caused thereby as will more clearly appear as the description proceeds.

The operation of the device will now be described. Let it be assumed, by way of example, that the device is installed in the anchor of a mine and that the mine and anchor have just been planted. Let it also be assumed that the mine has been disengaged from locking engagement with the anchor and has started to move upwardly within the water carrying one end of cable 10 with it. As cable 10 is payed out, the magnetic markings placed thereon cause the magnetic core 13 to be additionally and successively magnetized from a preloaded magnetic condition of just beneath the knee of the magnetization curve into the region of magnetic saturation.

Let it further be assumed, for the purpose of description, that the first magnetic signal received from cable 10 is of sufficient strength and polarity to cause the magnetism of core 13 to be increased sufficiently to saturate the core when the first magnetized portion of the cable has moved into close proximate spaced relation with respect thereto. When this occurs the self inductance as well as the mutual inductance of each inductor is changed and oscillations cease. With the tube in a non-oscillating condition, the plate current thereof increases sufficiently to cause relay 21 to operate and at armature 27 thereof transmit a pulse to the counting mechanism 29. This increase in the plate current also causes an increase in the current flowing in coil 11. The direction of winding of coil 11 and the direction of the direct current in the plate or output circuit are such that the field strength applied to the core member 13 suddenly increases in the same direction as the magnetic field applied to the core by the first magnetized portion of cable 10.

An arrangement is thus provided in which oscillations could not be resumed by magnetic "noise" or minor changes in the field strength and thus the device would not be recycled and revert to the original oscillating state except by a field of reversed sense of polarity or direction and of a predetermined intensity applied to core 13.

When the next succeeding magnetized section of the cable moves into proximate spaced relation with respect to the the coils 12—13, and the core 13 disposed therein, the oscillator does not resume oscillations until the field strength of reversed polarity or sense received from the cable 10 is of sufficient magnitude to overcome the electromagnetic field of the coil 11 set up by the plate current of the tube 15 while the tube is blocked. When this occurs, however, the tube 15 is unlocked and resumes oscillations thereby decreasing the plate current flowing through relay 21 and causing relay 21 to release and interrupt the circuit to the counting mechanism 29. In practice it has been found desirable to select the operating points and saturation densities of the core material such that the reversed field would be required to exceed the maximum value of the intended control field by a factor of at least 20 as a prerequisite condition to produce spurious or false operation as a result of saturation of the core 13 on the negative portion of the external magnetic signal. From the foregoing it will be apparent that over a large range of field strength a bistable oscillator has been devised which is relatively insensitive to magnetic noise and which requires control signals of opposite polarity applied consecutively in order to actuate the relay or counting means. Since relay 21 is operated once for each cycle of operations of the electronic oscillator metering device, the pulse output from the relay meters the length of cable that has moved past the oscillator coils and payed out from the mine anchor.

Figure 2:
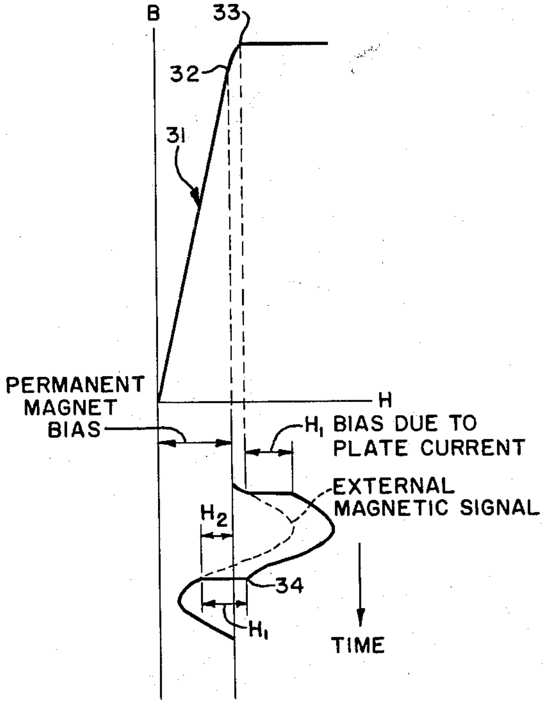
FIG. 2 is a diagram illustrating the variations in the magnetic state of the core during a cycle of operations of the device as the core is periodically magnetized to saturation by the magnetic markings of the cable.

The operation of the device will be better understood by reference to FIG. 2 of the drawings on which is shown a B—H curve of the core material indicated generally by the numeral 31. This material is initially biased by magnet 14 to a point on the curve indicated by numeral 32 just below the sharp knee thereof. In the assumed case, the external controlling field, which may be the payed out cable or any other source of magnetic field and which is shown by way of example on FIG. 2 as substantially sinusoidal, increases the magnetization of the core 13 through the point 33 thereof corresponding to a saturated condition of the core. When this occurs the inductance of the coil changes and as point 33 is reached oscillations cease. With tube 15 non-oscillating a relatively large increase in the plate current is effected and since there is a coil 11 connected in the plate circuit, the current through the coil increases. The direction of winding in the coil and the direction of the direct current in the plate or output circuit are such that the field strength applied to the core member suddenly increases by an amount $H_1$. This sudden increase is without effect at this time by reason of the fact that the coil is saturated. After the maximum field strength has been reached and the field is diminished in strength by the second magnetized portion of the cable in the example assumed, the controlling field reaches point 34 which is of the same magnitude and direction that it had at 33 but the oscillator is still not oscillating because the blocked plate or output current through the coil 11 keeps the core in a saturated condition. The increment $H_1$ is sufficiently large so that even if the external field were now removed, the oscillator would remain in a non-oscillating condition. When the field strength reversed in polarity or sense is of a magnitude $H_2$ sufficient to overcome the field strength which the ampere turns through the coil in its non-oscillating condition provided, the oscillator is unlocked and resumes its initial oscillating condition. The reversed control field, it will be recalled, is of but a small fractional part of the strength of an external field of this polarity and magnitude required to saturate the core material in a reverse direction. It will be clearly apparent, therefore, that over a large range of field strength a bistable oscillator has been achieved which is relatively insensitive to magnetic noise and which requires control signals of opposite polarity applied in consecutive order to selectively operate the oscillator and actuate the relay or counting means controlled thereby.

Figure 3:
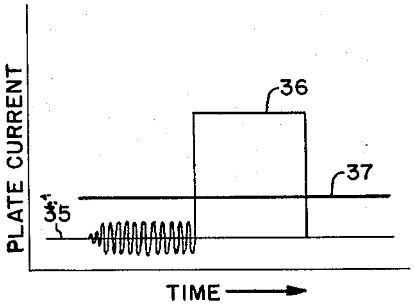
FIG. 3 is a curve on which is shown the variations of current of the oscillator cycle of counting operations.

On FIG. 3 there is shown the plate current for tube 15 during a cycle of operation. The average value of plate current flowing through relay 21 while the oscillator is in an oscillating condition is indicated by the line 35 which, it will be recalled, is of insufficient strength to cause relay 21 to operate. As the flux density of the core material is increased sufficiently to saturate the core, oscillations cease and the plate current flowing through relay 21 is increased as at 36 sufficiently to cause relay 21 to operate, the value of current required to operate relay 21 being indicated by the line designated 37.

Whereas the invention has been described with particular reference to the measurement of a length of mooring cable payed out from a mine anchor, it is not so limited as it will be understood by those skilled in the art, after understanding the invention, that it is equally suitable for use with other devices and for other purposes, such, for example, as measurements of lengths of cable employed in well drilling operation, systems for controlling production of manufactured items and the like.

Obviously many modifications and variations of the present invention are possible in the light of the above teachings. It is therefore to be understood that within the scope of the appended claims the invention may be practiced otherwise than as specifically described.

For example, such modifications may reside in the employment of transistor means in lieu of the electronic tube 15 illustrated and, if desired, an electronic relay may be employed for the electro-mechanical relay 21.

Furthermore, the coils 11—12 may be arranged in other than coaxial spaced relation or, if desired, only a single coil may be employed.

The source of the controlling m.m.f., although shown and described herein as a magnetized payed out cable may, of course, be obtained from alternately magnetized ferro-magnetic devices or elements carried on a conveyor belt, or the source may be a magnetized tape or the like which would be scanned by the metering device or the device may be employed, if desired, for programming or other control functions.

What is claimed as new and desired to be secured by Letters Patent of the United States is:

1. An electronic oscillator of the character disclosed comprising an electronic tube having a plate, a cathode, and a pair of grids therebetween, a tuned primary circuit comprising an induction coil connected to said plate, a tuned secondary circuit comprising a grid coil connected to one of said grids, said induction and grid coils being disposed at a distance sufficient to insure air coupling therebetween, a core of ferromagnetic material disposed within said coils, means for magnetically biasing the magnetization of said core just below the knee of the magnetization curve thereof whereby said tube oscillates, means for magnetically saturating said core thereby to effectively reduce the coupling between said coils and cause the tube to cease oscillations, and means including a relay in the plate circuit of said tube and adjusted to operate in response to an increase in current flowing therethrough as the tube ceases oscillation.

2. An oscillator according to claim 1 in which the core saturating means comprises a movable cable having magnetic markings arranged at intervals along the length thereof and magnetically coupled to said core in successive order as the cable moves past the core.

3. An oscillator according to claim 1 in which the other of the grids is connected to said tuned primary circuit.

4. An oscillator according to claim 1 in which the core is composed of grain oriented high nickel iron possessing a sharp saturation knee in the magnetization curve thereof.

5. An oscillator according to claim 1 in which the electromagnetic field set up by said induction coil in response to the increase in said plate current is sufficient to maintain the core magnetically saturated when said core saturating means has been removed.

6. An oscillator according to claim 5 including means for reducing the magnetization of said core below the knee of the magnetization curve thereof sufficiently to increase the magnetic coupling between said induction and grid coils to a value such that oscillation of the tube is resumed.

7. An electronic oscillator having an input circuit and an output circuit, means including a core of ferromagnetic material for inductively coupling the input circuit to the output circuit, means for magnetically biasing said core to a point below the magnetic saturation thereof at which point the oscillator continues to oscillate, and means for selectively applying an external field to said core sufficient to magnetically saturate the core and thereby block the oscillator and cause the oscillations to cease.

8. An electronic oscillator according to claim 7 in which means responsive to an increase in the current of the oscillator are provided for maintaining the core saturated after said external field has been removed.

9. An oscillator according to claim 8 further including means for applying an external field of opposite sense and polarity to said core to reduce the magnetization of the core to a value below the saturation thereof sufficient for the oscillator to resume oscillations.

10. An oscillator according to claim 9 including a counting mechanism, and electroresponsive counting mechanism control means operatively connected to the oscillator and operable selectively in accordance with the operating and non-operating condition respectively of the oscillator.

No references cited.